(12) United States Patent
Kino

(10) Patent No.: US 9,996,907 B2
(45) Date of Patent: Jun. 12, 2018

(54) IMAGE PICKUP APPARATUS AND IMAGE PROCESSING METHOD RESTRICTING AN IMAGE STABILIZATION RANGE DURING A LIVE VIEW OPERATION

(71) Applicant: Olympus Corporation, Shibuya-ku, Tokyo (JP)

(72) Inventor: Tatsuya Kino, Kodaira (JP)

(73) Assignee: Olympus Corporation, Tokyo (JP)

( * ) Notice: Subject to any disclaimer, the term of this patent is extended or adjusted under 35 U.S.C. 154(b) by 0 days. days.

(21) Appl. No.: 15/086,790

(22) Filed: Mar. 31, 2016

(65) Prior Publication Data

US 2017/0019612 A1    Jan. 19, 2017

(30) Foreign Application Priority Data

Jul. 13, 2015  (JP) ................. 2015-139928

(51) Int. Cl.
| | |
|---|---|
| *H04N 5/228* | (2006.01) |
| *G06T 5/00* | (2006.01) |
| *H04N 5/232* | (2006.01) |
| *G06T 5/50* | (2006.01) |
| *H04N 5/235* | (2006.01) |

(52) U.S. Cl.
CPC ............. *G06T 5/003* (2013.01); *G06T 5/50* (2013.01); *H04N 5/2356* (2013.01); *H04N 5/23254* (2013.01); *H04N 5/23287* (2013.01); *H04N 5/23293* (2013.01); *G06T 2207/20201* (2013.01)

(58) Field of Classification Search
CPC ........... H04N 5/23248; H04N 5/23258; H04N 5/23254; H04N 5/23287; H04N 5/23264; G03B 2205/0007; G02B 27/64; G02B 27/646

See application file for complete search history.

(56) References Cited

U.S. PATENT DOCUMENTS

| | | | | |
|---|---|---|---|---|
| 2007/0285521 | A1* | 12/2007 | Watanabe | .......... H04N 5/23248 348/208.99 |
| 2008/0106608 | A1* | 5/2008 | Clark | .................. H04N 5/23248 348/208.99 |
| 2009/0003813 | A1* | 1/2009 | Ohishi | ............... H04N 5/23248 396/55 |

(Continued)

FOREIGN PATENT DOCUMENTS

| | | |
|---|---|---|
| JP | 2006-086741 | 3/2006 |
| JP | 2012-049603 | 3/2012 |

*Primary Examiner* — Sinh Tran
*Assistant Examiner* — Selam Gebriel
(74) *Attorney, Agent, or Firm* — John C. Pokotylo; Pokotylo Patent Services

(57) ABSTRACT

An image pickup apparatus includes: an IS unit that corrects blurring during exposure by driving a lens or an image pickup device based on a blur amount detected by a blur detecting unit; an alignment processing section that calculates a correlation value for arbitrary two images among image data of a plural images obtained by consecutive photographing; a combination processing section that aligns and combines image data of the two images based on the correlation value; and a microcomputer that is capable of setting a consecutive photographing combination mode. In a case where the consecutive photographing combination mode is set, the IS unit restricts an image stabilization range during live view.

5 Claims, 9 Drawing Sheets

(56) References Cited

U.S. PATENT DOCUMENTS

2013/0107066 A1* 5/2013 Venkatraman ..... H04N 5/23248
　　　　　　　　　　　　　　　　　　　　　　348/208.4
2013/0107106 A1* 5/2013 Nakai ................ H04N 5/23258
　　　　　　　　　　　　　　　　　　　　　　348/347

* cited by examiner

IMAGE PICKUP APPARATUS AND IMAGE PROCESSING METHOD RESTRICTING AN IMAGE STABILIZATION RANGE DURING A LIVE VIEW OPERATION

CROSS REFERENCE TO RELATED APPLICATION

This application claims benefit of Japanese Application No. 2015-139928 filed in Japan on Jul. 13, 2015, the entire contents of which are incorporated herein by this reference.

BACKGROUND OF THE INVENTION

1. Field of the Invention

The present invention relates to an image pickup apparatus equipped with a function that combines image data of a plural images obtained by consecutive photographing to generate combined image data of a single image, and to an image processing method.

2. Description of the Related Art

In recent years, image pickup apparatuses have been proposed that are equipped with a function that combines a plurality of images obtained by consecutive photographing to thereby generate a single image. The image combination in this case is performed for the purpose of, for example, generating a high dynamic range image (HDR image), a low noise image (NR (noise reduction) image), or a super-resolution image. With respect to the plurality of images that are the source of the image combination, it is desirable that there is little camera shake during exposure and that an amount of a positional shift between each image is small.

On the other hand, image stabilization mechanisms (IS mechanisms) that correct camera shake by moving an image pickup device or a lens have also been proposed.

With regard to camera shake during exposure, the camera shake during exposure can be corrected if the image stabilization mechanism is used during exposure of each image at a time of consecutive photographing. Further, with regard to a positional shift between respective images, for example, in Japanese Patent Application Laid-Open Publication No. 2006-86741, technology is disclosed that efficiently corrects a positional shift between respective images by determining an image stabilization range based on information such as a pixel pitch, a focal length, and angular blur between images obtained by blur detecting means.

In this case, when an IS mechanism is continuously operated while a plurality of images are been consecutively photographed, in some cases the stroke limit of the IS mechanism will be exceeded. In such a case, it is not possible to correct camera shake during exposure. Therefore, in order to correct camera shake during exposure of each image with the same accuracy, centering processing is performed that returns the IS mechanism to the initial position thereof each time photographing of a single image ends. However, the centering processing produces a positional shift between the respective images.

With respect to the above described positional shift between images, it is possible to calculate a global vector showing a shift amount by performing a correlation operation between images, and to correct the positional shift during combination processing based on the calculated global vector. For example, in Japanese Patent Application Laid-Open Publication No. 2012-49603, technology is described that compares two images to acquire a local vector showing a partial shift amount, acquires a global vector showing a shift amount for the entire images, and aligns and combines the two images using these acquired vectors.

However, in particular, in a case where the exposure time will be long or the like, because the stroke amount of the IS mechanism is increased and the positional shift amount between images caused by centering processing also increases, a considerably wide region will be adopted as a search target for calculating a global vector that shows a shift amount based on the images. In addition, when the positional shift between images is large, it means that an image portion that is common to a plurality of images is small.

In this connection, conventionally, in a camera in which an IS mechanism is mounted, in order to confirm the photographing range immediately prior to photographing without being affected by camera shake, the IS mechanism is actuated from a time point at which a first release switch is turned on, and thereafter when a second release switch is turned on, the actual exposure is performed while continuing to perform image stabilization while the IS mechanism remains in an actuated state. By this means, in particular in a case where camera shake is liable to arise, such as telephotography, confirmation of a photographing range can be stably performed.

SUMMARY OF THE INVENTION

An image pickup apparatus according to an aspect of the present invention is an image pickup apparatus having a function that combines image data of a plural images obtained by consecutive photographing and generates combined image data of a single image, including: a blur detecting section that detects a size of a movement of the image pickup apparatus as a blur amount; an image stabilization section that, based on a blur amount detected by the blur detecting section, corrects blurring during exposure by driving at least one of a lens and an image pickup device as a driving object; a correlation value calculating section that, with respect to image data of arbitrary two images among the image data of the plural images obtained by consecutive photographing, calculates a correlation value using image data within a predetermined region of each of the two images; a combination processing section that performs alignment of the image data of the two images based on the correlation value, and combines the image data of the two images; and a mode setting section that is capable of setting a consecutive photographing combination mode that is a photographing mode for performing combination by the combination processing section; wherein, in a case where the consecutive photographing combination mode is set, the image stabilization section restricts an image stabilization range during live view.

An image processing method according to an aspect of the present invention is an image processing method that can combine image data of a plural images obtained by consecutive photographing to generate combined image data of a single image, including: a first step of correcting blurring during exposure by driving at least one of a lens and an image pickup device as a driving object, based on a blur amount obtained by detecting a size of a movement of an image pickup apparatus; a second step of, with respect to image data of arbitrary two images among the image data of the plural images obtained by consecutive photographing, calculating a correlation value using image data within a predetermined region of each of the two images; a third step of performing alignment of the image data of the two images based on the correlation value, and combining the image data of the two images; and a fourth step in which a consecutive photographing combination mode that is a photographing mode for performing combination by means of the third step can be set; wherein, in a case where the consecutive photographing combination mode is set in the fourth step, an image stabilization range during live view is restricted in the first step.

DETAILED DESCRIPTION OF THE PREFERRED EMBODIMENTS

Embodiments of the present invention are described below with reference to the drawings.
[First Embodiment]

Figure 1:
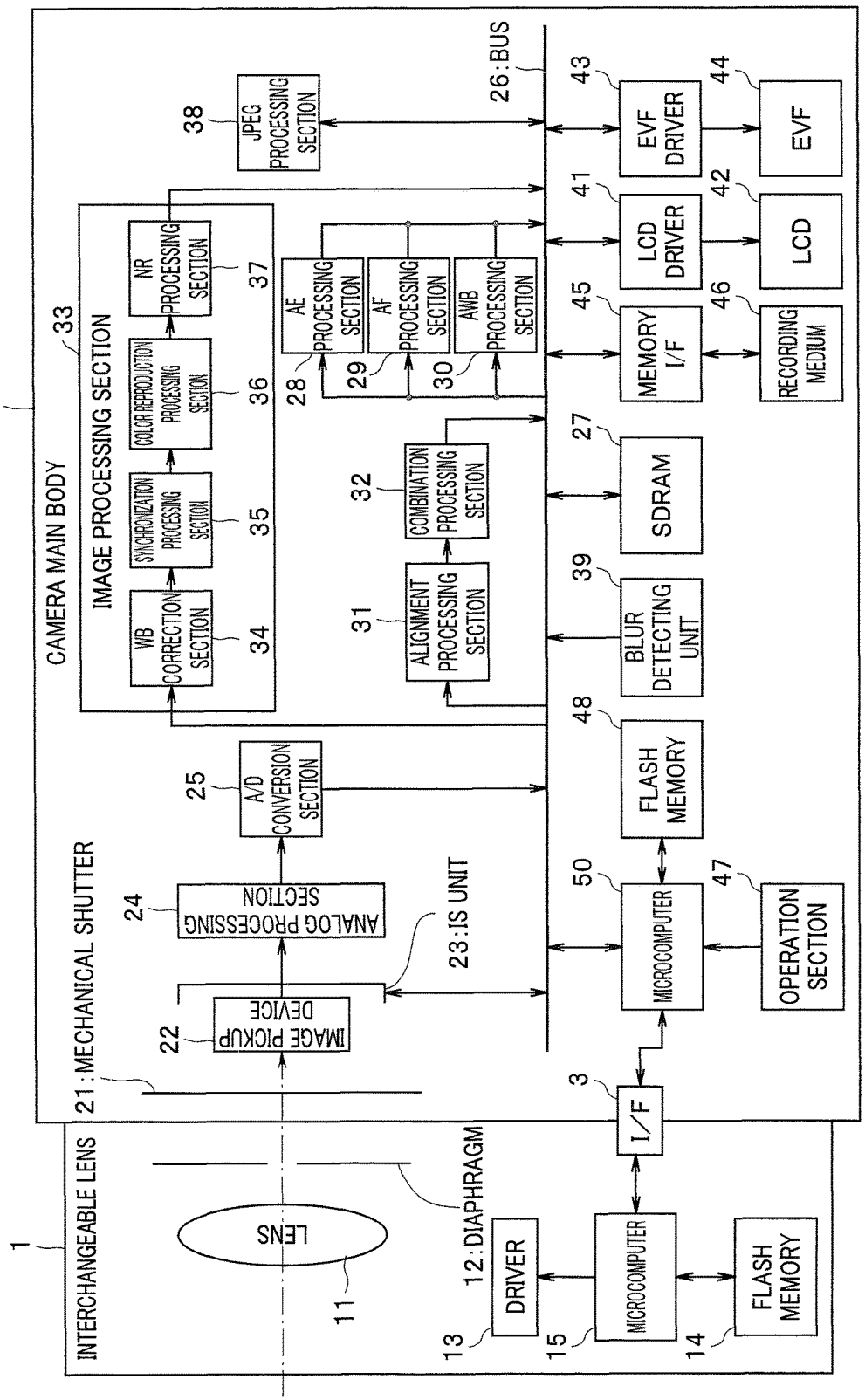
FIG. 1 is a block diagram showing a configuration of an image pickup apparatus according to a first embodiment of the present invention.

FIGS. 1 to 9 are diagrams illustrating a first embodiment of the present invention. FIG. 1 is a block diagram illustrating a configuration of an image pickup apparatus. Note that, although the present embodiment is described taking a digital camera as an example of an image pickup apparatus, the present invention is not limited thereto, and may be applied to an arbitrary apparatus as long as the apparatus includes an image pickup function.

The image pickup apparatus is constituted by connecting an interchangeable lens 1 and a camera main body 2 through an interface (I/F) 3 so as to enable communication therebetween, and has a function that combines image data of a plural images obtained by consecutive photographing to generate combined image data of a single image.

The interchangeable lens 1 is configured, for example, to be detachably attachable to the camera main body 2 via a lens mount. The interface 3 is constituted by electric contacts formed on the lens mount or the like (an electric contact provided on the interchangeable lens 1 side and an electric contact provided on the camera main body 2 side).

The interchangeable lens 1 includes a lens 11, a diaphragm 12, a driver 13, a flash memory 14 and a microcomputer 15.

The lens 11 is a photographing optical system for forming an optical image of an object on an image pickup device 22, described later, of the camera main body 2.

The diaphragm 12 is an optical diaphragm that controls a passing range of a light beam from the lens 11 towards the image pickup device 22.

The driver 13 drives the lens 11 to perform adjustment of a focus position based on a command from the microcomputer 15, and in a case where the lens 11 is an electric zoom lens or the like the driver 13 also changes the focal distance. In addition, based on a command from the microcomputer 15, the driver 13 drives the diaphragm 12 to change the opening diameter. By driving the diaphragm 12, the brightness of an optical image of an object changes, and the size of blurring or the like also changes.

The flash memory 14 is a storage medium that stores a control program that is executed by the microcomputer 15 and various kinds of information relating to the interchangeable lens 1.

The microcomputer 15 is a so-called "lens-side computer", and is connected to the driver 13, the flash memory 14 and the interface 3. The microcomputer 15 communicates with a microcomputer 50 that is a main body-side computer, described later, through the interface 3, and receives commands from the microcomputer 50 to perform reading/writing of information stored on the flash memory 14 to thereby control the driver 13. In addition, the microcomputer 15 sends various kinds of information relating to the interchangeable lens 1 to the microcomputer 50.

The interface 3 connects the microcomputer 15 of the interchangeable lens 1 and the microcomputer 50 of the camera main body 2 to enable bidirectional communication therebetween.

The camera main body 2 includes a mechanical shutter 21, an image pickup device 22, an IS (image stabilization) unit 23, an analog processing section 24, an analog/digital conversion section (A/D conversion section) 25, a bus 26, an SDRAM 27, an AE processing section 28, an AF processing section 29, an AWB processing section 30, an alignment processing section 31, a combination processing section 32, an image processing section 33, a JPEG processing section 38, a blur detecting unit 39, an LCD driver 41, an LCD 42, an EVF (electronic view finder) driver 43, an EVF 44, a memory interface (memory I/F) 45, a recording medium 46, an operation section 47, a flash memory 48 and the microcomputer 50.

The mechanical shutter 21 controls a time period taken for a light beam from the lens 11 to reach the image pickup device 22, and is configured as, for example, an optical shutter that causes a shutter curtain to travel. The mechanical shutter 21 is driven by a command of the microcomputer 50, and controls a time period taken for a light beam to reach the image pickup device 22, that is, an exposure time period of an object by the image pickup device 22.

The image pickup device 22 is an image pickup section that has a plurality of pixels which are two-dimensionally arrayed at a predetermined pixel pitch on an image pickup surface, and that, based on control of the microcomputer 50 as an image pickup control section, receives a light beam from the lens 11 and the diaphragm 12 to pick up an image (that is, photoelectrically converts an optical image of an object for which an image was formed) and generates an analog image signal. In this case, in order that the image pickup device 22 is disposed so that a surface that is perpendicular to the optical axis of the lens 11 is a light-receiving surface, the direction of the two-dimensional shaped array of the plurality of pixels is a direction that is perpendicular to the optical axis of the lens 11.

The image pickup device 22 of the present embodiment is configured as, for example, a single-panel type image pickup device in which color filters of a primary color Bayer array (a R (red), G (green) and B (blue) Bayer array) are disposed on the front face of a plurality of pixels arrayed in the vertical direction and horizontal direction. Note that the image pickup device 22 is naturally not limited to a single-panel type image pickup device, and for example may be an image pickup device that is laminated so as to separate color components in the substrate thickness direction.

The IS unit 23 is an image stabilization section that corrects blurring during exposure by driving at least one of the lens 11 and the image pickup device 22 as a driving object based on a blur amount that is detected as described later by the blur detecting unit 39, and that is also capable of centering processing that resets the driving object to a predetermined position during a period from a time point at which exposure of a single image ends until exposure of a next single image starts.

In the present embodiment, an example is described in which the IS unit 23 has a configuration that adopts a sensor shift method that moves the image pickup device 22 in a direction that cancels out camera shake in a plane that is perpendicular to the optical axis based on movement of the image pickup apparatus that is detected as described later by the blur detecting unit 39. However, for the image stabilization section, a lens shift method that moves the lens 11 may be adopted, or both of a sensor shift method and a lens shift method may be adopted.

The analog processing section 24 performs waveform shaping upon reducing reset noise and the like with respect to an analog image signal that is read out from the image pickup device 22, and furthermore increases a gain so as to achieve an intended brightness.

The A/D conversion section 25 converts an analog image signal outputted from the analog processing section 24 to a digital image signal (referred to as "image data" as appropriate).

The bus 26 is a transfer path for transferring various kinds of data or control signals generated at a certain place inside the image pickup apparatus to another place inside the image pickup apparatus. The bus 26 according to the present embodiment is connected to the IS unit 23, the A/D conversion section 25, the SDRAM 27, the AE processing section 28, the AF processing section 29, the AWB processing section 30, the alignment processing section 31, the combination processing section 32, the image processing section 33, the JPEG processing section 38, the blur detecting unit 39, the LCD driver 41, the EVF driver 43, the memory I/F 45 and the microcomputer 50.

Image data outputted from the A/D conversion section 25 (hereinafter referred to as "RAW image data" as appropriate) is transferred via the bus 26 and temporarily stored in the SDRAM 27.

The SDRAM 27 is a storing section that temporarily stores the aforementioned RAW image data or various kinds of data such as image data that was processed at the combination processing section 32, the image processing section 33 or the JPEG processing section 38 or the like.

The AE processing section 28 calculates an object luminance based on RAW image data. The object luminance that is calculated by the AE processing section 28 is used for automatic exposure (AE) control, that is, control of the diaphragm 12, control of the mechanical shutter 21, or exposure timing control of the image pickup device 22 (or control of a so-called "electronic shutter") or the like.

The AF processing section 29 extracts a signal of a high-frequency component from RAW image data, and acquires a focusing evaluation value by AF (auto focus) integration processing. The focusing evaluation value acquired here is used for AF driving of the lens 11. Note that the AF is naturally not limited to this kind of contrast AF, and for example a configuration may be adopted so as to perform phase contrast AF using a dedicated AF sensor (or an AF pixel on the image pickup device 22).

The AWB processing section 30 detects a color balance of an object based on RAW image data, calculates respective gains for each component of R, G and B, and performs auto white balance processing that adjusts the white balance by multiplying by the calculated gains.

The alignment processing section 31 is a correlation value calculating section that calculates a correlation value using image data within respective predetermined regions with respect to image data of an arbitrary two images (one of which is referred to as a "standard image", and the other of which is referred to as an "object image") among image data of a plural images obtained by consecutive photographing, and calculates a shift amount of the object image relative to the standard image based on the calculated correlation value.

The combination processing section 32 is an image combination section that generates combined image data of a single image by aligning and then combining the standard image and the object image in accordance with a positional shift based on the correlation value calculated by the alignment processing section 31. The image combination performed in this case may be any kind of image combination such as, for example, high dynamic range image combination (HDR image combination) using a plurality of images of different exposure amounts, addition combination using a plurality of images for which time-division exposure was performed, average combination, comparative bright combination, or comparative dark combination, or super-resolution image combination using a plurality of images which were subjected to pixel shifting by a movement amount which is a non-integer multiple of a pixel pitch.

In the case of combining a plurality of images acquired in the consecutive photographing combination mode, for example, first, an image that is acquired first is set as a standard image (however, as described later, a configuration may also be adopted that allows a user to select the standard image). Next, while setting an image that is acquired second or setting images that are newly acquired thereafter in sequence as an object image, by performing the processing by the alignment processing section 31 and the combination processing section 32 that is described above until a final image is acquired, a final combined image is generated.

Note that the processing by the alignment processing section 31 and the combination processing section 32 may be performed with respect to RAW image data, or may be performed with respect to image data subjected to image processing by the image processing section 33.

The image processing section 33 performs various kinds of image processing on RAW image data or combined image data that is generated from RAW image data by the combination processing section 32, and includes a WB correction section 34, a synchronization processing section 35, a color reproduction processing section 36 and an NR processing section 37.

The WB correction section 34 performs white balance processing on image data so that a white object is observed as white.

The synchronization processing section 35 performs demosaicking processing that converts from image data of an RGB Bayer array in which only one color component among the RGB components is present per pixel to image data in which all pixels include all of the three color components of R, G and B by determining color components that are not present on the pixel of interest by interpolation based on peripheral pixels.

The color reproduction processing section 36 performs processing that more faithfully reproduces a color of an object, by performing a color matrix operation on image data.

The NR processing section 37 performs noise reduction processing by performing coring processing that corresponds to a spatial frequency or the like on image data.

Image data that is obtained after undergoing various kinds of processing by the image processing section 33 is again stored in the SDRAM 27.

When recording image data, the JPEG processing section 38 reads out image data from the SDRAM 27, compresses the image data according to the JPEG compression scheme to thereby generate JPEG image data, and stores the compressed image data in the SDRAM 27. A header and the like are added by the microcomputer 50 to the JPEG image data stored in the SDRAM 27, and the JPEG image data is then recorded as a JPEG file on the recording medium 46 via the memory I/F 45.

Further, the JPEG processing section 38 also performs expansion of compressed image data. That is, when performing reproduction of a recorded image, based on control of the microcomputer 50, for example, a JPEG file is read out from the recording medium 46 via the memory I/F 45 and temporarily stored on the SDRAM 27. The JPEG processing section 38 expands, in accordance with the JPEG expansion method, JPEG image data in the JPEG file that is stored on the SDRAM 27, and stores the expanded image data on the SDRAM 27.

The blur detecting unit 39 is a blur detecting section that includes a gyro sensor or the like, and for example detects a size of a movement of the image pickup apparatus caused by camera shake or the like as a blur amount. The blur detecting unit 39 is configured to output a detection result to the microcomputer 50.

The LCD driver 41 reads out image data that is stored in the SDRAM 27, converts the image data that is read into a video signal, and drivingly controls the LCD 42 to cause the LCD 42 to display an image that is based on the video signal.

The LCD 42 displays an image as a result of being drivingly controlled by the LCD driver 41 as described above, and also displays various kinds of information relating to the image pickup apparatus.

The EVF driver 43 reads out image data that is stored in the SDRAM 27, converts the image data that is read into a video signal, and drivingly controls the EVF 44 to cause the EVF 44 to display an image that is based on the video signal.

The EVF 44 displays an image as a result of being drivingly controlled by the EVF driver 43 as described above, and also displays various kinds of information relating to the image pickup apparatus.

In this case, an image display that is performed on the LCD 42 or the EVF 44 includes a REC view display that displays image data immediately after photographing for a short time period only, a reproduction display of a JPEG file that is recorded on the recording medium 46, and a live view display and the like.

The memory I/F 45 is a recording control section that performs control to record image data to the recording medium 46, and also performs reading out of image data from the recording medium 46.

The recording medium 46 is a recording section that nonvolatily stores image data, and is constituted, for example, by a memory card that can be detachably inserted into the camera main body 2. However, the recording medium 46 is not limited to a memory card, and may be a disk-shaped recording medium or another arbitrary recording medium. Accordingly, it is not necessary for the recording medium 46 to be an inherent component of the image pickup apparatus.

The operation section 47 is a section for performing various kinds of input operations with respect to the image pickup apparatus, and includes: a power button for turning the power of the image pickup apparatus on and off; a release button for instructing the start of photographing of an image, which, for example, is formed of a two-stage operation button configured to have a first release switch and a second release switch; a reproduction button for performing reproduction of a recorded image; a menu button for performing settings for the image pickup apparatus and the like; and operation buttons such as cross keys that are used for an operation to select an item and an OK button that is used for an operation to confirm a selected item. In this case, items that can be set using the menu button, cross keys and OK button include a photographing mode (single-shot photographing mode, consecutive photographing mode, consecutive photographing combination mode and the like), a recording mode (JPEG recording mode, RAW+JPEG recording mode and the like), and a reproduction mode. When an operation is performed with respect to the operation section 47, a signal in accordance with the operation contents is outputted to the microcomputer 50.

The flash memory 48 is a storage medium that nonvolatily stores processing programs that are executed by the microcomputer 50, and various kinds of information relating to the image pickup apparatus. In this case, several examples may be mentioned as the information that the flash memory 48 stores, such as parameters that are used for image processing, a model name and serial number for identifying the image pickup apparatus, and setting values that are set by a user. The information that the flash memory 48 stores is read by the microcomputer 50.

The microcomputer 50 controls each section within the camera main body 2 and also sends commands to the microcomputer 15 through the interface 3 to control the interchangeable lens 1, and is a control section that performs overall control of the image pickup apparatus. When a user performs an input operation at the operation section 47, in accordance with a processing program that is stored on the flash memory 48, the microcomputer 50 reads in parameters required for processing from the flash memory 48 and executes various sequences according to the operation contents.

The microcomputer 50 as a control section is configured to function as an image pickup control section that, particularly in a photographing mode, acquires image data of a single image by causing the image pickup device 22 to perform an image pick-up operation while causing the aforementioned IS unit 23 to perform image stabilization.

In addition, the microcomputer 50 functions as a mode setting section that is capable of setting a consecutive photographing combination mode that is a photographing mode for performing combination by means of the combination processing section 32, in accordance with input of settings from the operation section 47, or in accordance with automatic settings according to a processing program that is read in from the flash memory 48.

Figure 2:
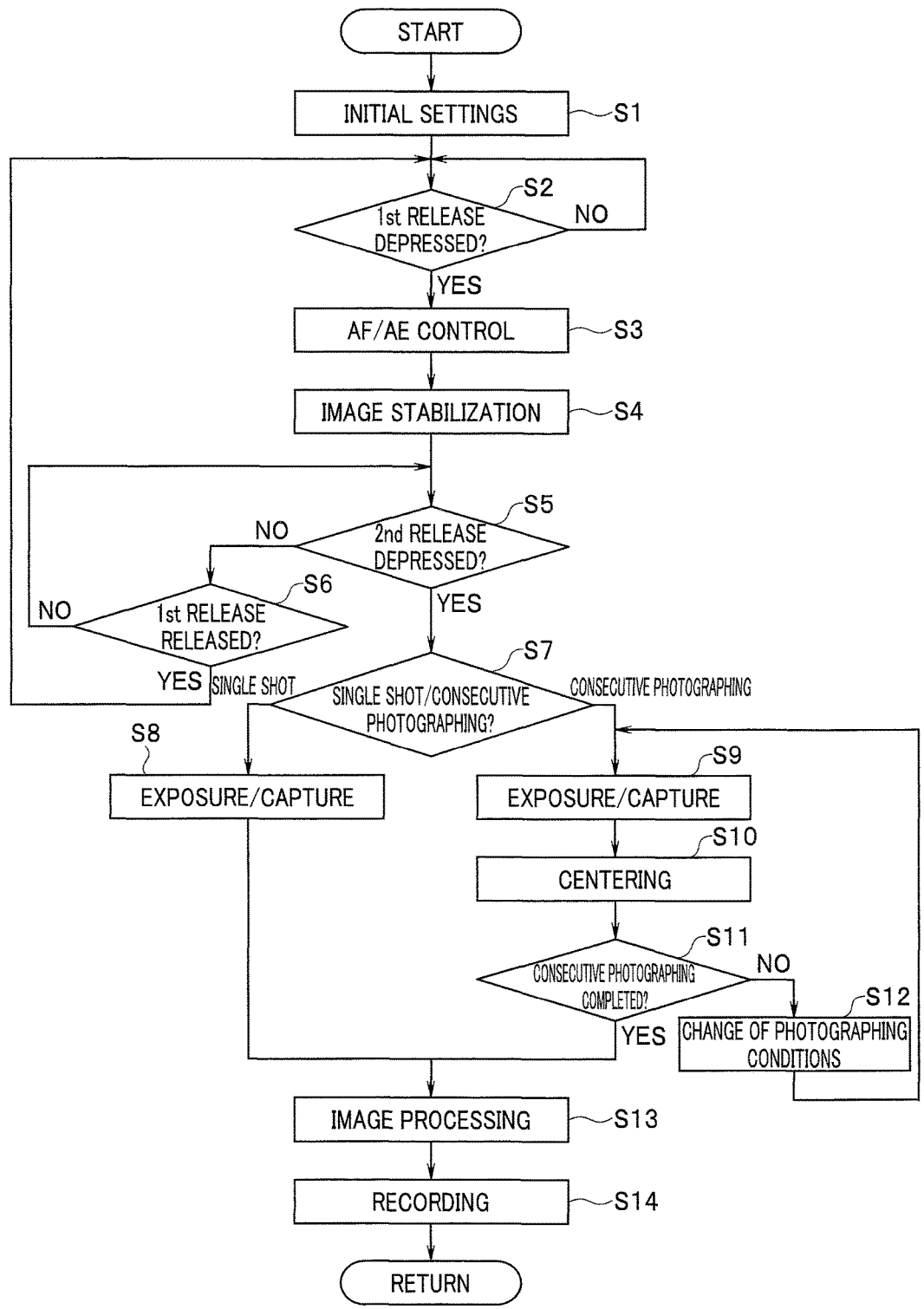
FIG. 2 is a flowchart illustrating processing in a single-shot photographing mode and a consecutive photographing mode in the image pickup apparatus of the first embodiment.

FIG. 2 is a flowchart illustrating processing in a single-shot photographing mode and a consecutive photographing mode of the image pickup apparatus. This processing (and processing illustrated in each flowchart described hereinafter) is performed based on control of the microcomputer 50 as the control section.

When the power of the image pickup apparatus is turned on by means of the power button and processing of a main routine that is not illustrated in the drawings is being performed, this processing is executed if the image pickup apparatus is set to the photographing mode by operation of the operation section 47.

Thereupon, first, initial setting is performed (step S1). For the initial setting, for example, camera settings such as the type of photographing mode and the image processing settings are read in.

Next, the microcomputer 50 determines whether or not the release button half-pressed and a first release switch is turned on (step S2).

In this case, if it is determined that the first release switch is off, the microcomputer 50 stands by for the first release switch to be turned on. During the period in which the microcomputer 50 stands by for the first release switch to be turned on, the mechanical shutter 21 is in an open state, and the live view is performed.

When the microcomputer 50 determines that the first release switch is turned on, based on the most recent image acquired in the live view, a photometric operation is performed by the AE processing section 28 and a range-finding operation is performed by the AF processing section 29, and the microcomputer 50 calculates the photographing conditions (step S3).

In general, in order to confirm the photographing range immediately prior to photographing without being affected by camera shake, when the first release switch is turned on, the IS unit 23 is driven to correct camera shake and stabilize the image. Therefore, in this case, at a time that the first release switch is on, the microcomputer 50 performs an image stabilization operation by driving the IS unit 23 as the image stabilization section in accordance with the output of the blur detecting unit 39 (step S4). By this means, it is possible to confirm the photographing range in a state in which the influence of camera shake is eliminated.

Next, the microcomputer 50 determines whether or not the release button is fully pressed and the second release switch is turned on (step S5).

If the microcomputer 50 determines in this case that the second release switch is off, the microcomputer 50 determines whether or not the first release switch changed to an off state (step S6).

If the microcomputer 50 determines that the first release switch changed to an off state, the microcomputer 50 returns to step S2 to perform the above described processing, while if the microcomputer 50 determines that the first release switch is still on, the microcomputer 50 returns to step S5 to standby until the second release switch is turned on.

Thus, in step S5, if the microcomputer 50 determines the second release switch is turned on, the microcomputer 50 determines whether the photographing mode is the single-shot photographing mode or the consecutive photographing mode (step S7). The single-shot photographing mode is a photographing mode that acquires a single still image with a single photographing operation. The consecutive photographing mode is a photographing mode that consecutively acquires a plurality of still image with a single photographing operation, and refers to a mode that is not the consecutive photographing combination mode that performs combination processing with respect to an acquired plurality of images (processing including a case including the consecutive photographing combination mode is described later referring to FIG. 6).

Here, if the microcomputer 50 determines that the photographing mode is the single-shot photographing mode, exposure by the image pickup device 22 is performed, the generated image is processed by the analog processing section 24 and the A/D conversion section 25, and an image to be stored in the SDRAM 27 is captured (step S8). Note that, because the exposure in this case is generally performed using the mechanical shutter 21 (however, use of an electronic shutter is not precluded), exposure is performed by temporarily closing the mechanical shutter 21 and thereafter actuating the mechanical shutter 21 once again to open and close.

Further, in step S7, also in a case where it is determined that the photographing mode is the consecutive photographing mode, exposure by the image pickup device 22 is performed, the generated image is processed by the analog processing section 24 and the A/D conversion section 25, and an image to be stored in the SDRAM 27 is captured (step S9).

By continuing to drive the IS unit 23 as an image stabilization section in accordance with the output of the blur detecting unit 39 even while the exposure in step S8 or step S9 is being performed, an exposure blur that is caused by camera shake during exposure is corrected.

When exposure ends, as preparation for performing the next exposure, centering processing is performed that returns the IS unit 23 again to the initial position thereof from the position to which the IS unit 23 moved from the initial position (step S10). The centering processing in this case is an operation that, when exposing a next image during consecutive photographing, is necessary to correct blurring during exposure with a similar stroke as a previous image.

The microcomputer 50 then determines whether or not consecutive photographing is completed (step S11). If the microcomputer 50 determines that consecutive photographing is not completed, changing of the photographing conditions is performed as necessary (step S12), and the operation returns to step S9 to capture an exposure of the next image.

In a case where the processing in step S8 is performed, or in a case where it is determined in step S11 that consecutive photographing is completed, image processing is performed by the image processing section 33 with respect to a single image acquired by single-shot photographing or a plurality of images acquired by consecutive photographing (step S13).

Further, an image on which image processing is performed is then recorded on the recording medium 46 via the memory I/F 45 (step S14), and the processing then returns to main processing that is not illustrated in the drawings.

Figure 3:
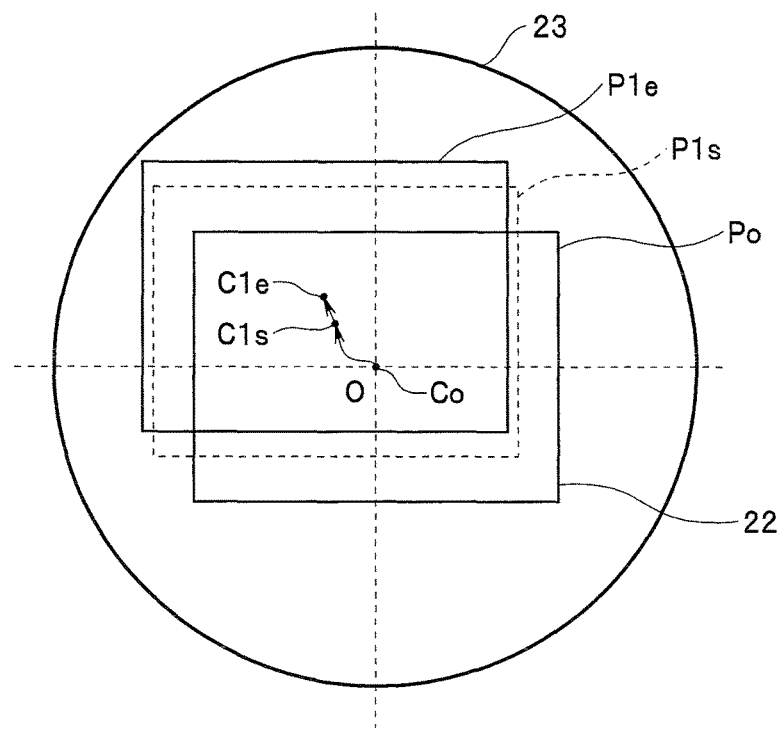
FIG. 3 is a view illustrating an example of operations of an IS unit during single-shot photographing or consecutive photographing from a time point immediately after a first release switch is turned on until a second release switch is turned on and exposure of a first image ends in the first embodiment.

FIG. 3 is a view illustrating an example of operations of the IS unit 23 during single-shot photographing or consecutive photographing from immediately after the first release switch is turned on until the second release switch is turned on and exposure of a first image ends.

Simultaneously with the first release switch being turned on, the IS unit 23 starts to operate. Hence, at a time point at which the first release switch is turned on, the IS unit 23 is at the initial position, and a center Co of the image pickup device 22 that is shown at a position Po matches the center of the optical axis (in this case, a center O of the IS unit 23).

During a period in which the first release switch is on, the IS unit 23 is driven so as to correct camera shake detected by the blur detecting unit 39, and the image pickup device 22 is moved in a direction such that the camera shake is cancelled out.

Accordingly, at a time point at which the second release switch is turned on (that is, a time point at which exposure of a first image is started), a center C1s of the image pickup device 22 that is shown at a position P1s is generally a position to which the center of the image pickup device 22 moved from the center O of the IS unit 23.

During exposure of the first image also, the IS unit 23 continues to be driven so as to correct camera shake that is detected by the blur detecting unit 39.

As a result, at the time point at which exposure of the first image ends, a center C1e of the image pickup device 22 that is shown at a position P1e is a position to which the center of the image pickup device 22 moved, for example, by a large amount from the center O of the IS unit 23.

In a case where the photographing mode is the single-shot photographing mode, the photographing ends at this time, and normally the state of the image pickup apparatus returns to a state of the live view.

Figure 4:
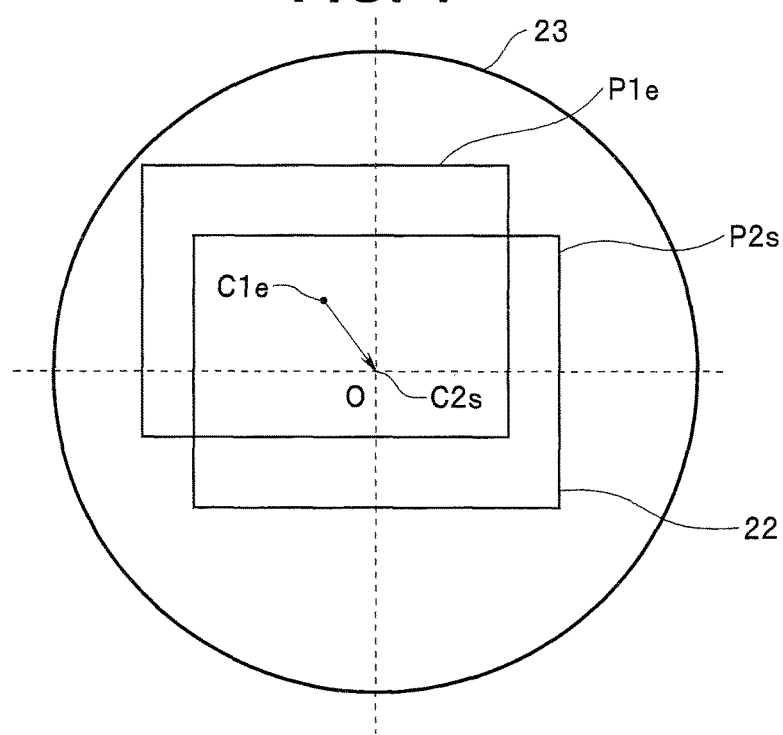
FIG. 4 is a view illustrating an example of operations of the IS unit during consecutive photographing from a time point that exposure of a first image ends until exposure of a second image is started in the first embodiment.

FIG. 4 is a view illustrating an example of operations of the IS unit 23 during consecutive photographing, from a time that exposure of a first image ends until exposure of a second image is started.

During consecutive photographing, as described above, centering processing is performed for correcting blurring during exposure of a next image with the same stroke as for the previous image. Accordingly, at a time point at which exposure of a second image is started, a center C2s of the image pickup device 22 shown at a position P2s returns to the center O of the IS unit 23 that is the initial position.

Figure 5:
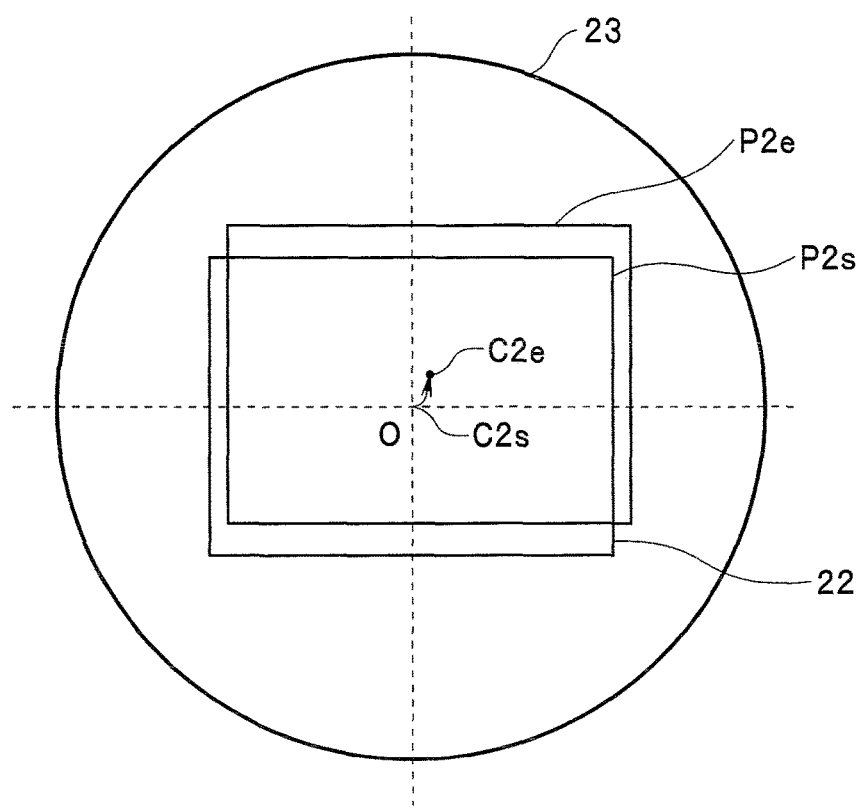
FIG. 5 is a view illustrating an example of operations of the IS unit during consecutive photographing from a time point that exposure of a second image is started until exposure of the second image ends in the first embodiment.

FIG. 5 is a view illustrating an example of operations of the IS unit 23 during consecutive photographing, from a time that exposure of a second image is started until exposure of the second image ends.

After centering processing is performed at the time point at which exposure of the second image is started, the IS unit 23 is driven so as to correct camera shake detected by the blur detecting unit 39. Accordingly, a center C2e of the image pickup device 22 shown at a position P2e at a time point at which exposure of the second image ends, is a position reached as a result of moving from the center O of the IS unit 23.

However, the movement amount of the IS unit 23 at a time point at which exposure of a second or subsequent image ends is substantially only a movement amount for correcting blurring during exposure, since the movement amount of the IS unit 23 at the aforementioned time point does not include a movement amount that arises from a time that the first release switch is turned on until exposure of the first image is started, such as in the case of the movement amount of the IS unit 23 at a time point at which exposure of the first image ends. Accordingly, as will be understood by comparing FIG. 5 and FIG. 3, a distance from the center O to the center C2e is much less than a distance from the center O to the center C1e.

Figure 6:
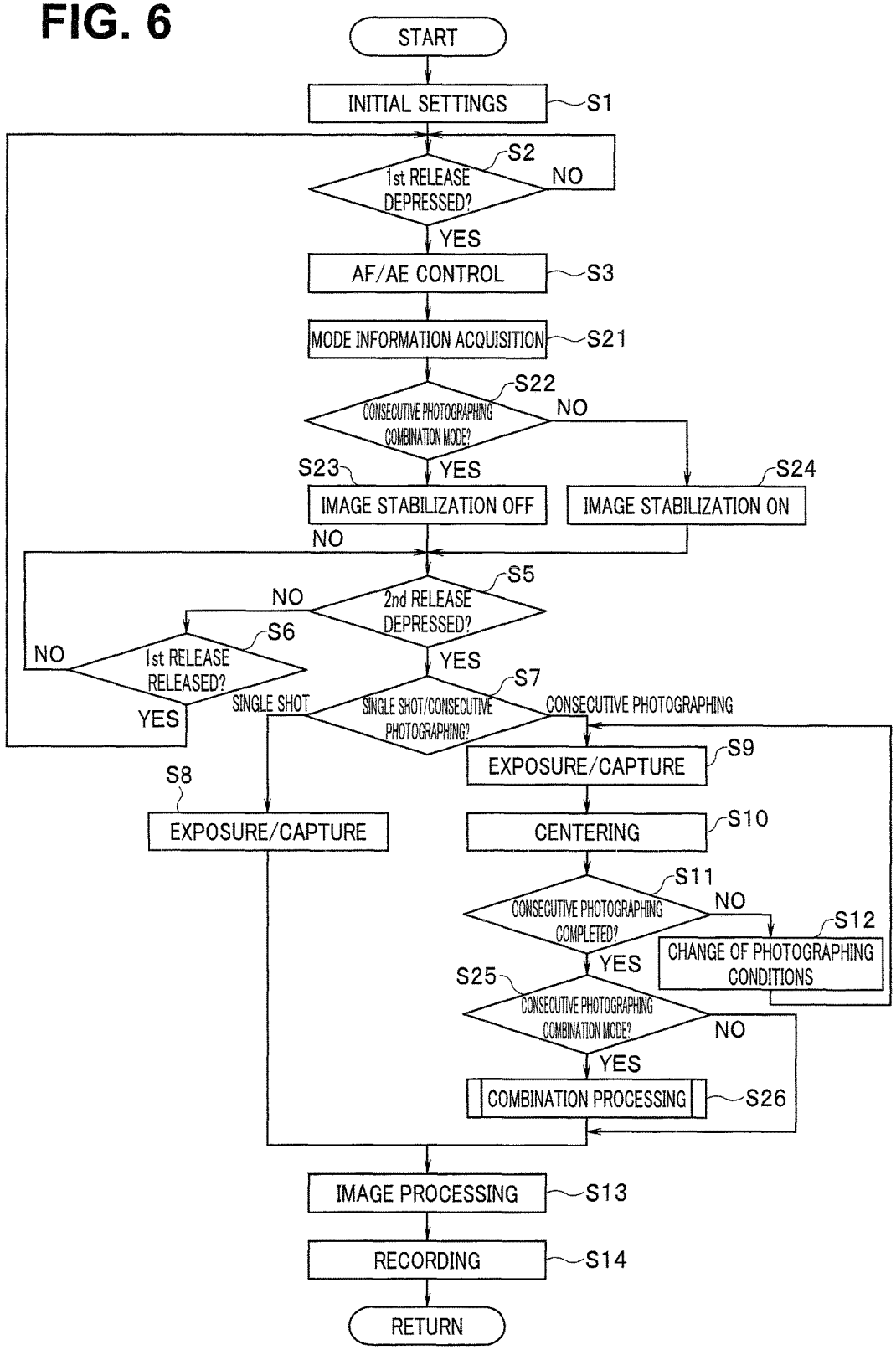
FIG. 6 is a flowchart illustrating processing in photographing modes including a consecutive photographing combination mode in the image pickup apparatus of the first embodiment.

FIG. 6 is a flowchart illustrating processing of photographing modes including the consecutive photographing combination mode of the image pickup apparatus.

When this processing is started and the processing in steps S1 to S3 is performed, the microcomputer 50 acquires information of the photographing mode that is set in the image pickup apparatus (step S21).

Next, the microcomputer 50 determines whether or not the acquired photographing mode is the consecutive photographing combination mode (step S22).

If the microcomputer 50 determines in step S22 that the photographing mode is the consecutive photographing combination mode, the microcomputer 50 performs the processing from steps S5 to S6 after turning off image stabilization by the IS unit 23 (step S23). On the other hand, if the microcomputer 50 determines in step S22 that the photographing mode is not the consecutive photographing combination mode, the microcomputer 50 performs the processing from steps S5 to S6 after turning on image stabilization by the IS unit 23 (step S24). However, a period in which image stabilization is turned off by the processing in step S23 is only the period in which the second release switch is turned on.

If it is determined in step S5 that the second release switch is turned on, after turning on image stabilization again in a case where image stabilization is turned off in step S23, in step S7 it is determined whether the photographing mode is the single-shot photographing mode or the consecutive photographing mode. Unlike the processing in FIG. 2, the consecutive photographing mode with respect to which a determination is made in this case also includes the consecutive photographing combination mode that is accompanied by image combination, and not just the consecutive photographing mode that is not accompanied by image combination.

If it is determined in this case that the photographing mode is the consecutive photographing mode, the microcomputer 50 performs the processing from step S9 to S12, and when it is determined in step S11 that consecutive photographing is completed, the microcomputer 50 determines whether or not the consecutive photographing mode is the consecutive photographing combination mode (step S25).

In this case, if it is determined that the consecutive photographing mode is the consecutive photographing combination mode, correlation value calculation is performed by the alignment processing section 31 with respect to a plurality of images that are acquired, and image combination is performed by the combination processing section 32 based on the calculated correlation value to generate a combined image (step S26). This combination processing is described later referring to FIG. 7.

In a case where the processing in step S26 is performed, if it was determined in step S25 that the photographing mode is not the consecutive photographing combination mode, or if the processing in step S8 was performed, the processing in step S13 and step S14 is performed and the operation then returns from this processing to an unshown main processing.

Figure 7:
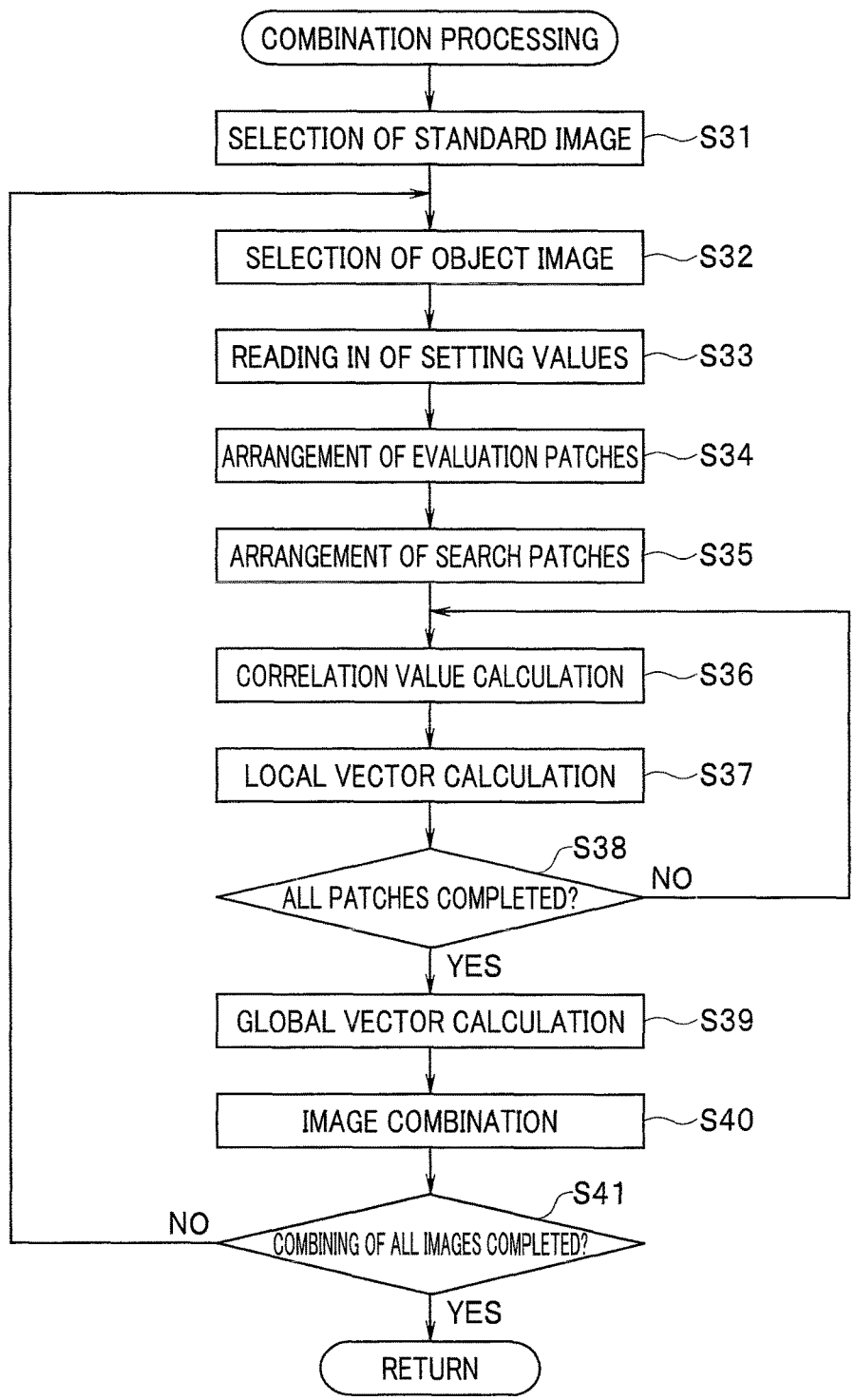
FIG. 7 is a flowchart illustrating details of combination processing in step S26 of FIG. 6 of the first embodiment.

FIG. 7 is a flowchart illustrating the details of the combination processing in step S26 in FIG. 6. Note that although in FIG. 7 an example is illustrated of processing in which another single image is combined with a certain specific image, and thereafter other images are combined in sequence with the combined image, the processing is not limited thereto.

When this processing starts, first, an image (standard image) to serve as a standard when performing combination processing is selected (step S31). This selection may be made by displaying a graphic user interface (GUI) on the LCD 42 to allow the user to select the image, or a configuration may be adopted so as to automatically select the first image of consecutive photographing as a standard image by taking into consideration a release time lag or the like (that is, this is because, if the second or a subsequent image is selected as the standard image, it will not be possible to obtain a combined image with the composition intended by the user at a time point at which the second release operation is performed).

Next, an object image to be initially combined with the standard image is selected from among the other consecutive photographing images other than the standard image (step S32). Normally, it is sufficient for this processing to be processing that automatically selects images in the order of the consecutive photographing.

Next, correlation values are calculated with respect to the selected standard image and object image, and processing that performs a vector operation to calculate a local vector and a global vector is performed as described hereunder. There are various methods available for calculating a local vector and a global vector, and in this case a general method of calculating a local vector and a global vector by block matching is described as an example.

First, a number of patches that is a number of regions for calculating a correlation value, the size of an evaluation patch EP that is a region for evaluating, and the size of a search patch SP that is a region for searching are read in as setting values (step S33).

Figure 8:
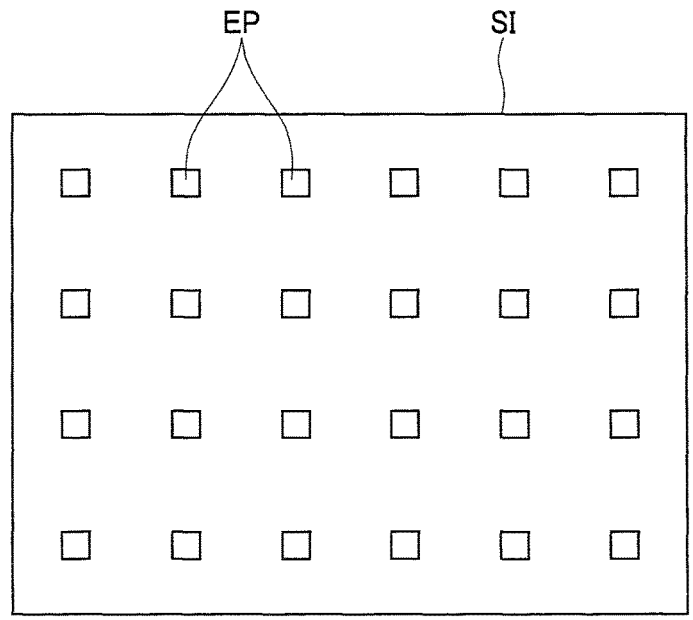
FIG. 8 is a view illustrating the manner in which evaluation patches are arranged on a standard image in the first embodiment.

Next, evaluation patches EP are arranged as a plurality of regions with respect to a standard image SI (step S34). FIG. 8 is a view illustrating the manner in which the evaluation patches EP are arranged on the standard image SI in this case. As shown in FIG. 8, the evaluation patches EP, for example, are arrayed at regular intervals in the vertical direction and horizontal direction within the standard image SI.

Figure 9:
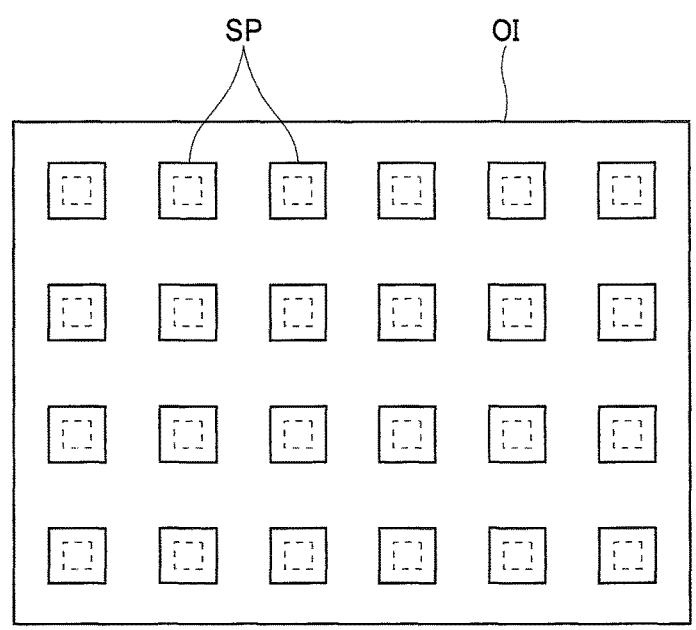
FIG. 9 is a view illustrating the manner in which search patches are arranged on an object image in the first embodiment.

In addition, with respect to an object image OI, search patches SP that are regions of a larger size than the evaluation patches EP are arranged so as to be in a one-to-one correspondence with the evaluation patches EP of the standard image SI (step S35). FIG. 9 is a view illustrating the manner in which the search patches SP are arranged on the object image OI in this case. As shown in FIG. 9, the search patches SP are also arrayed, for example, at regular intervals in the vertical direction and horizontal direction within the object image OI.

Next, block matching is performed. That is, one pair of an evaluation patch EP and a search patch SP whose positions correspond is selected. Further, the evaluation patch EP is scanned within the search patch SP, and a sum of absolute difference values (SAD values) is calculated as a correlation value for each scan position (step S36).

Next, a scan position at which the smallest value is obtained among the plurality of SAD values that are calculated while scanning is taken as the scanning position for which the correlation value is highest, and a vector between the aforementioned scan position and the position of the original evaluation patch EP is calculated as a local vector (step S37).

Thereafter, the microcomputer 50 determines whether or not processing is completed for all pairs of an evaluation patch EP and a search patch SP whose positions correspond (step S38). If it is determined here that processing of all pairs is not yet completed, the microcomputer 50 returns to step S36 and selects the next pair of an evaluation patch EP and a search patch SP, and then performs the above described processing. Thus, calculation of a correlation value is performed for each patch that is a set region.

When it is determined in step S38 that processing is completed for all pairs of an evaluation patch EP and a search patch SP, the microcomputer 50 calculates a vector histogram of all the local vectors, and calculates, for example, a modal vector in the calculated vector histogram as a global vector (however, the vector calculated here is not limited to a modal vector, and may be an average vector or a weighted average vector or the like) (step S39).

When calculating local vectors and a global vector by the above described processing, the processing time period and the vector length that can be calculated depend on the size of the search patch SP. Therefore, a configuration may be adopted so that, when calculating a correlation value, the standard image SI and the object image OI are reduced in advance, local vectors and a global vector are calculated using the reduced standard image SI and object image OI, and thereafter the calculated local vectors and global vector are enlarged to correspond to the image size before reduction and applied. By this means, the size of the search patches SP in the image that is not reduced can be made substantially large while shortening the processing time period, and a case in which the vector length is long can also be supported. A maximum width of the size of the respective search patches SP in the image that is not reduced is referred to hereunder as "correlation value search range" as appropriate.

Next, the microcomputer 50 performs processing to combine the object image with the current combined image (step S40). This combination processing is performed, for example, after aligning the object image with the standard image. In this case, with respect to the specific method for combining images, for example, a method that performs alignment using obtained local vectors and an obtained global vector and combines two images as described in the aforementioned Japanese Patent Application Laid-Open Publication No. 2012-49603 may be used (although a method for combining the images is not limited to this combination method).

Thereafter, the microcomputer 50 determines whether or not combining of all images is completed (step S41), and if there is an image that is not combined, the microcomputer 50 returns to step S32 and selects the next unprocessed image as the object image, and then performs the processing as described above.

When it is determined in step S41 that combining of all images is completed, the microcomputer 50 returns from this processing.

According to the first embodiment, in a case where the consecutive photographing combination mode is set, because the IS unit 23 does not perform image stabilization during live view during a period from when the first release switch is turned on until the second release switch is turned on, a difference between the photographing range of a first image and a second or subsequent image does not become large and narrowing of a combination range for image combination processing is prevented, and thus a decrease in image quality can be suppressed.

Further, because centering processing immediately prior to the start of exposure of a first image is not performed, a combined image of a photographing range that the user intended can be obtained.

In addition, since normal image stabilization is performed during exposure after the second release switch is turned on, blurring during exposure of each image during consecutive photographing can be suppressed, and the image quality of the combined image can be ensured.

Further, in a case where the consecutive photographing combination mode is not set, live view during a period from when the first release switch is turned on until the second release switch is turned on can be observed in a state in which the influence of blurring is decreased.

[Second Embodiment]

Figure 10:
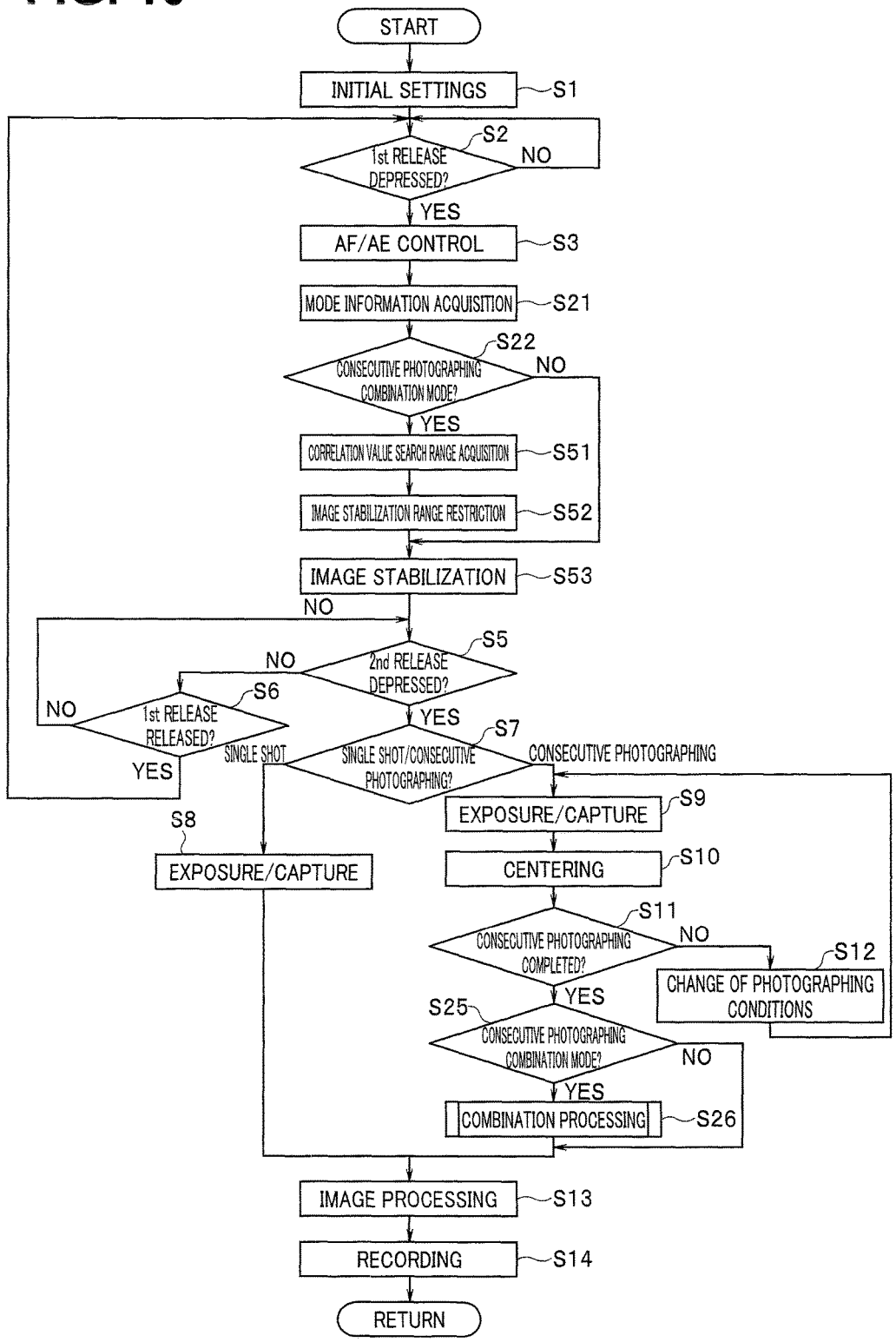
FIG. 10 is a flowchart illustrating processing in photographing modes including a consecutive photographing combination mode in an image pickup apparatus according to a second embodiment of the present invention.
Figure 11:
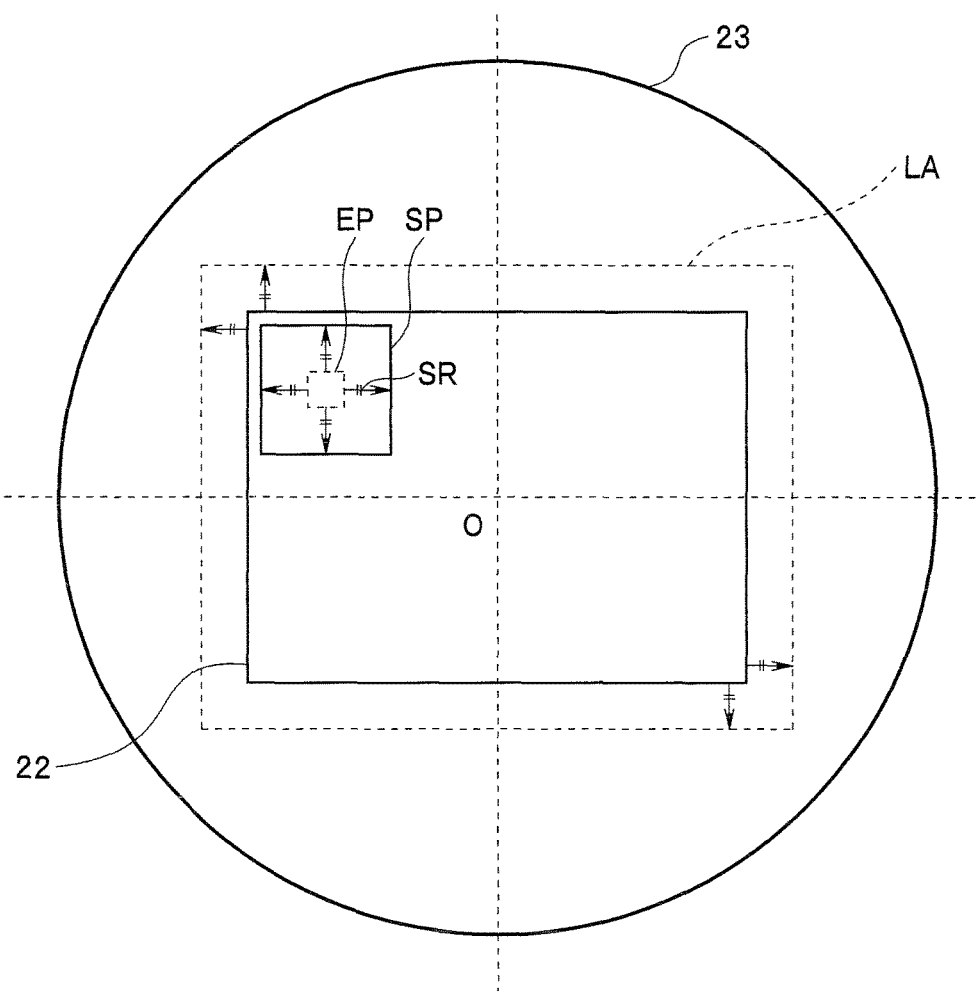
FIG. 11 is a view illustrating a restricted image stabilization range in an IS unit during live view after a first release switch is turned on in a case where the consecutive photographing combination mode is set in the second embodiment.

FIG. 10 and FIG. 11 illustrate a second embodiment of the present invention. FIG. 10 is a flowchart illustrating processing of photographing modes including the consecutive photographing combination mode in the image pickup apparatus.

In the second embodiment, components that are the same as the components in the above described first embodiment are, for example, denoted by the same reference numerals and signs and explanation of the components is omitted as appropriate. Only differences are mainly explained.

While in the above-described first embodiment a configuration is adopted so that, in a case where the consecutive photographing combination mode is set, image stabilization is turned off during a period in which the live view is being performed from a time when the first release switch is turned on until the second release switch is turned on, the present embodiment is an embodiment in which a configuration is adopted so as to restrict the image stabilization range instead of turning off image stabilization.

When this processing is started, processing from step S1 to S3 and step S21 to S22 is performed, and if it is determined in step S22 that the photographing mode is the consecutive photographing combination mode, the microcomputer 50 acquires a correlation value search range (step S51).

The correlation value search range is determined by acquiring the size of an evaluation patch EP and the size of a search patch SP, and as described above, in order to search for the smallest value of the correlation values, the size of the search patch SP with respect to which a scan of the evaluation patch EP is performed has a maximum width in an image that is not reduced. In this case, the correlation value search range can be reduced in a case where an exposure time of a single image during consecutive photographing is short, while in a case where the exposure time of a single image is long, it is necessary to enlarge the correlation value search range to ensure the alignment accuracy.

In addition, based on the acquired correlation value search range, the microcomputer 50 restricts an image stabilization range of image stabilization performed during live view from a time that the first release switch is turned on until the second release switch is turned on (step S52). That is, although in the normal image stabilization a moving range (full stroke) of the IS unit 23 is a range in which image stabilization is possible, during live view after the first release switch is turned on in a case where the consecutive photographing combination mode is set according to the present embodiment, a correlation value search range that is a shift amount with respect to which alignment is possible in combination processing that is performed in a post-stage is adopted as the image stabilization range.

The microcomputer 50 performs image stabilization within the restricted image stabilization range in a case where step S52 is performed, or within the normal image stabilization range in a case where it is determined in step S22 that the photographing mode is not the consecutive photographing combination mode (step S53). Accordingly, in the case of the consecutive photographing combination mode, even if blurring that exceeds the restricted image stabilization range occurs, image stabilization that tracks the blurring is not performed.

Thereafter, processing from step S5 to S14 that includes step S25 and step S26 is performed similarly to the above described FIG. 6 (accordingly, image stabilization is performed within the normal image stabilization range during exposure of each image), and the microcomputer 50 then returns from this processing to an unshown main processing.

FIG. 11 is a view illustrating a restricted image stabilization range in the IS unit 23 during live view after the first release switch is turned on in a case where the consecutive photographing combination mode is set.

The image stabilization range in which the image pickup device 22 can move in the IS unit 23 is restricted based on a search range SR that is a range in which the evaluation patch EP is scanned within the search patch SP when calculating correlation values. That is, a restricted image stabilization range LA is a range in which the image pickup device 22 whose center matches the center O of the IS unit 23 is movable that takes the search range SR as an upper limit in the horizontal left and right directions and also takes the search range SR as an upper limit in the vertical up and down directions.

By controlling so as to only track blurring within this restricted image stabilization range LA, since a movement amount of the IS unit 23 during a period from when the first release switch is turned on until the second release switch is turned on falls within a range in which it is possible to calculate local vectors and a global vector, it is possible to achieve both image stabilization and image combination in a compatible manner.

Note that, although an example of a restricted image stabilization range of the IS unit 23 according to the sensor shift method is described here, the image stabilization range may also be restricted in a similar manner in the case of a lens shift method.

According to the second embodiment, substantially the same advantageous effects as in the foregoing first embodiment are obtained, and furthermore, because the IS unit 23 is configured to restrict the image stabilization range during live view in the consecutive photographing combination mode based on the correlation value search range at the alignment processing section 31, live view from a time that the first release switch is turned on until the second release switch is turned on can be observed in a state in which the influence of blurring is reduced to a certain extent.

Further, as described above, because the magnitude of the correlation value search range changes in accordance with the exposure time of a single image during consecutive photographing, for example, a configuration is also possible in which a user switches the setting of the IS unit 23 and manually restricts the image stabilization range in accordance with a setting value of the exposure time of a single image. In this regard, according to the configuration of the present embodiment, because a correlation value search range is automatically acquired and the image stabilization range is automatically restricted, there is the advantage that such time and effort on behalf of the user are not required.

Note that the respective sections explained above may be configured as circuits. Any circuit may be implemented as a single circuit or may be implemented as a combination of a plurality of circuits if the circuit can perform the same function. Further, any circuit is not limited to a circuit configured as a dedicated circuit for performing an intended function and may be a configuration that performs the intended function by causing a general-purpose circuit to execute a processing program.

Further, in the above explanation, the image pickup apparatus is mainly explained. However, the present invention may be an image processing method for performing processing that is the same as the processing of the image pickup apparatus or may be a processing program for causing a computer to perform processing that is the same as the processing of the image pickup apparatus, a computer-readable non-transitory recording medium that records the processing program, and the like.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus having a function that combines image data of a plural images obtained by consecutive photographing and generates combined image data of a single image, comprising:
    a blur detecting sensor that detects a size of a movement of the image pickup apparatus as a blur amount;
    an image stabilization actuator that, based on the blur amount detected by the blur detecting sensor, corrects blurring during exposure by driving at least one of a lens and an image pickup device as a driving object; and
    a processor including
        a correlation value calculating section that, with respect to image data of arbitrary two images among the image data of the plural images obtained by consecutive photographing, calculates a correlation value using image data within a predetermined region of each of the two images,
        a combination processing section that performs alignment of the image data of the two images based on the correlation value, and combines the image data of the two images, and
        a mode setting section that is capable of setting a consecutive photographing combination mode that is a photographing mode for performing combination by the combination processing section;
    wherein, in a case where the consecutive photographing combination mode is set, the image stabilization actuator restricts an image stabilization range during live view.

2. The image pickup apparatus according to claim 1, wherein, in a case where the consecutive photographing combination mode is set, the image stabilization actuator does not perform image stabilization during live view.

3. The image pickup apparatus according to claim 1, wherein the image stabilization actuator restricts the image stabilization range during live view, based on a correlation value search range at the correlation value calculating section.

4. An image processing method that can combine image data of a plural images obtained by consecutive photographing to generate combined image data of a single image, comprising:
    a first step of correcting blurring during exposure by driving to move at least one of a lens and an image pickup device as a driving object, based on a blur amount obtained by detecting a size of a movement of an image pickup apparatus;
    a second step of, with respect to image data of arbitrary two images among the image data of the plural images obtained by consecutive photographing, calculating a correlation value using image data within a predetermined region of each of the two images;
    a third step of performing alignment of the image data of the two images based on the correlation value, and combining the image data of the two images; and
    a fourth step in which a consecutive photographing combination mode that is a photographing mode for performing combination by means of the third step can be set;
    wherein, in a case where the consecutive photographing combination mode is set in the fourth step, an image stabilization range during live view is restricted in the first step.

5. The image pickup apparatus according to claim 1 wherein the processor determines whether or not a consecutive photographing combination mode is set and
    responsive to a determination that the consecutive photographing combination mode is set, reducing or eliminating the performance of image stabilization during live view during a period from when a first release switch is turned on until the second release switch is turned on, and otherwise, responsive to a determination that the consecutive photographing combination mode is not set, performing normal blur correcting in a live view during a period from when the first release switch is turned on until the second release switch is turned on.

* * * * *